(12) United States Patent
Leonard et al.

(10) Patent No.: US 8,755,681 B2
(45) Date of Patent: Jun. 17, 2014

(54) LINE EQUIPPED WITH A COUPLING HAVING AN INTEGRATED HEATING ELEMENT

(71) Applicant: Inergy Automotive Systems Research (Societe Anonyme), Brussels (BE)

(72) Inventors: Stephane Leonard, Brussels (BE); Joel Op De Beeck, Lint (BE); Vincent Potier, Brussels (BE)

(73) Assignee: Inergy Automotive Systems Research (S.A.), Brussels (BE)

( * ) Notice: Subject to any disclaimer, the term of this patent is extended or adjusted under 35 U.S.C. 154(b) by 0 days.

(21) Appl. No.: 13/871,680

(22) Filed: Apr. 26, 2013

(65) Prior Publication Data

US 2013/0241192 A1 Sep. 19, 2013

Related U.S. Application Data

(63) Continuation of application No. 12/377,276, filed as application No. PCT/EP2007/058686 on Aug. 21, 2007, now Pat. No. 8,452,167.

(30) Foreign Application Priority Data

Aug. 25, 2006 (FR) ...................................... 06 07531

(51) Int. Cl.
*F24H 1/18* (2006.01)
(52) U.S. Cl.
USPC ............ 392/441; 392/447; 392/448; 392/485
(58) Field of Classification Search
None
See application file for complete search history.

(56) References Cited

U.S. PATENT DOCUMENTS

| 3,754,118 | A | 8/1973 | Booker |
| 4,815,769 | A | 3/1989 | Hopperdietzel |
| 4,920,602 | A | 5/1990 | Kuehbauch |
| 5,791,377 | A | 8/1998 | LaRochelle |
| 5,859,953 | A | 1/1999 | Nickless |
| 5,957,384 | A | 9/1999 | Lansinger |
| 7,311,268 | B2 | 12/2007 | Sporer et al. |
| 7,875,835 | B2 | 1/2011 | Tanaka et al. |
| 8,075,020 | B2 | 12/2011 | Colosimo et al. |
| 8,448,426 | B2 | 5/2013 | Peucat et al. |
| 2006/0252292 | A1 | 11/2006 | Sonderegger et al. |

FOREIGN PATENT DOCUMENTS

| DE | 3709308 | 10/1987 |
| DE | 19613579 | 10/1997 |
| DE | 29715336 U | 11/1997 |
| DE | 19902431 | 8/2000 |
| DE | 10212413 | 1/2004 |
| FR | 2902136 | 12/2007 |

(Continued)

OTHER PUBLICATIONS

English translation of Japanese Office Action for Japanese Application No. 2009-525062 mailed Jun. 26, 2012, 4 pages.

*Primary Examiner* — Thor Campbell
(74) *Attorney, Agent, or Firm* — Oblon, Spivak, McClelland, Maier & Neustadt, L.L.P.

(57) ABSTRACT

A urea feed or return line (2) that comprises a hollow coupling (1) enabling it to be connected to a urea tank and that comprises a passage for the urea, this coupling being, in addition, equipped with a heating filament (9), at least one part of which extends freely inside the passage provided for the urea, this part having the shape of a loop or a spiral capable of also extending at least partly into the tank and/or into a tube attached thereto.

9 Claims, 1 Drawing Sheet

(56) References Cited

FOREIGN PATENT DOCUMENTS

| | | |
|---|---|---|
| GB | 2 076 618 A | 12/1981 |
| JP | 56-172287 | 5/1980 |
| JP | 57-96876 | 12/1980 |
| JP | 61-3765 | 1/1986 |
| JP | 2006-200660 A | 8/2006 |
| WO | WO 2005080850 | 9/2005 |
| WO | WO 2006064001 | 6/2006 |
| WO | WO 2007141312 | 12/2007 |

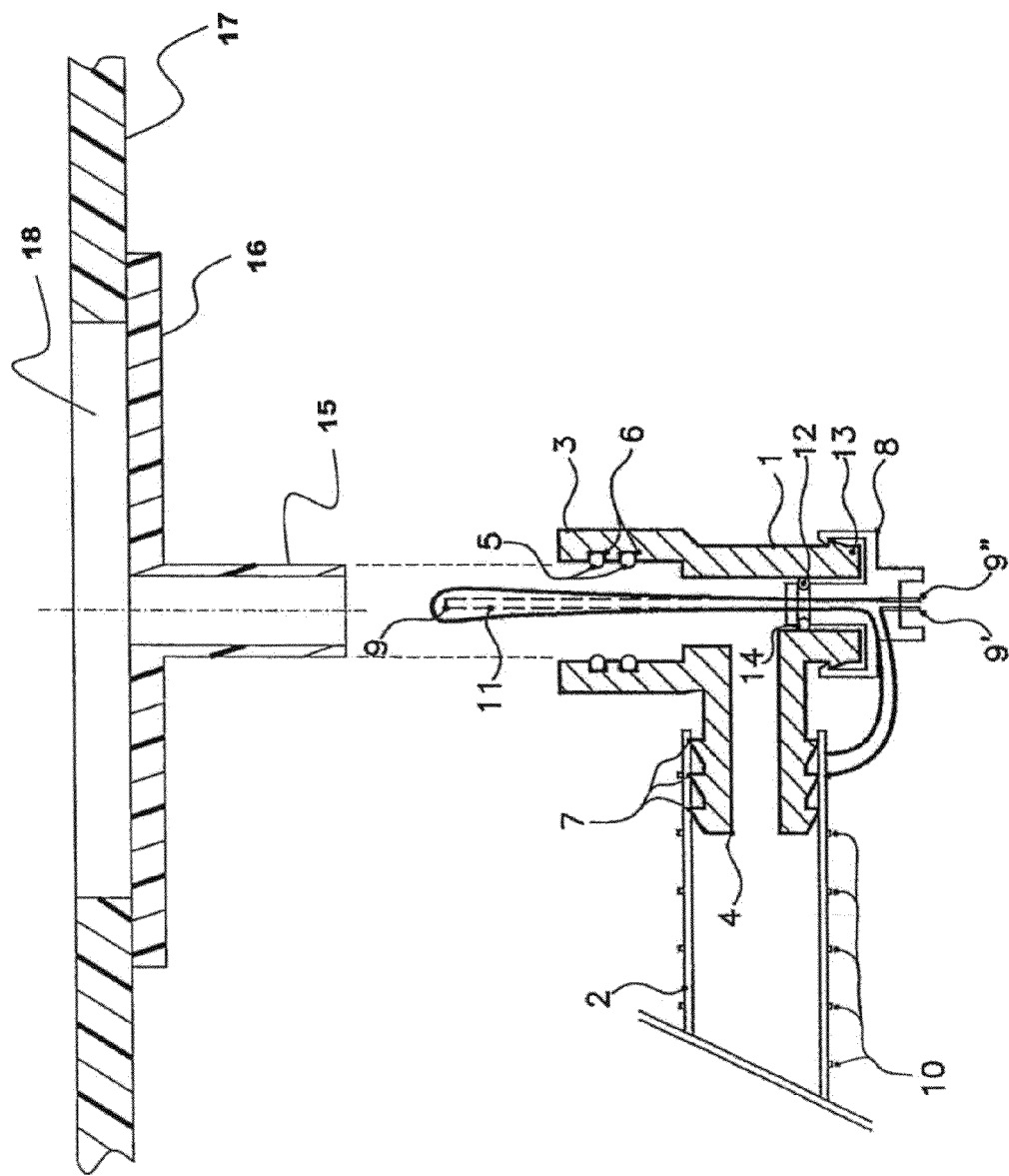

LINE EQUIPPED WITH A COUPLING HAVING AN INTEGRATED HEATING ELEMENT

CROSS-REFERENCE TO RELATED APPLICATIONS

This application is a continuation application of U.S. application Ser. No. 12/377,276, filed Feb. 12, 2009, which is a U.S. national stage application under 35 U.S.C. §371 of International Application No. PCT/EP2007/058686 filed Aug. 21, 2007, which claims priority to French Application No. FR06.07531 filed Aug. 25, 2006, these applications being herein incorporated by reference in their entirety for all purposes.

The present application relates to a coupling with an integrated heating element and also to its use for connecting feed or return lines to a urea tank.

Legislation on vehicle and heavy goods vehicle emissions stipulate, amongst others, a reduction in the release of nitrogen oxides NOx into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process the high levels of NOx produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolysed before converting the nitrogen oxide (NOx) to nitrogen ($N_2$) and water ($H_2O$).

In order to do this, it is necessary to equip the vehicles with a tank containing an additive (generally urea) solution and also a device for metering the desired amount of additive and injecting it into the exhaust line. Given that the aqueous urea solution generally used for this purpose (eutectic water/urea solution with 32.5 wt % urea) freezes at $-11°$ C., it is necessary to provide a heating device to liquefy the solution in order to be able to inject it into the exhaust line in the event of starting in freezing conditions.

Several systems have been provided in the prior art for this purpose. Generally, these systems comprise relatively expensive heating devices that involve either specific heating elements or a bypass of the engine cooling circuit (for example, see Application WO 2006/064001 in the name of the Applicant).

As regards the use of specific heating elements, it is known to put heating filaments inside the tank containing the urea solution, and optionally in the urea (feed and return, if necessary) lines. However, the Applicant has observed that a problem arises at the connections of the urea lines to the tank. This is because a plug of ice (frozen solution) tends to form in and around them, and given that they are generally injection-moulded parts made of plastic of a certain thickness, heating via an external heating filament is not effective.

The present application aims to solve this problem by providing a coupling for a liquid tank that is capable of rapidly removing the plugs of frozen liquid that may have formed inside it.

For this purpose, the present invention relates to a hollow coupling that makes it possible to connect, to a liquid tank, a line enabling the liquid to be transported, and being equipped for this purpose with a passage for said liquid, this coupling being, in addition, equipped with a heating filament, at least one part of which extends freely inside the passage provided for the liquid. Such an arrangement makes it possible to ensure that the liquid is in direct contact with a large heating surface area, and therefore to heat it rapidly.

The liquid in question within the scope of the invention is a compound that is liquid under normal usage conditions. It is preferably a reducing agent capable of reducing the NOx present in the exhaust gases of internal combustion engines. Advantageously, it is a solution of a precursor that generates ammonia (an effective reducing agent) in situ in the exhaust gases. The invention gives good results with urea as a precursor and, in particular, with aqueous solutions of urea. Eutectic water/urea solutions (comprising 32.5 wt % of urea and that freeze around $-11°$ C.) are well suited.

The coupling according to the invention is intended to be connected to a liquid tank. This tank may be made from any material, preferably one that is chemically resistant to the liquid in question. In general, this is metal or plastic. In the case of urea, polyolefin resins, in particular polyethylene (and more particularly HDPE or high-density polyethylene), constitute preferred materials.

The coupling according to the invention is therefore intended to couple, to this tank, a line that enables the liquid to be transported, for example to convey it to a means of injecting said liquid into the exhaust gases of an engine in the case of urea. This variant of the invention (according to which the tank is a urea tank) may be applied to any internal combustion engine capable of generating NOx in its exhaust gases. It may be an engine with or without a fuel return line (that is to say, a line returning the surplus fuel not consumed by the engine to the fuel tank). It is advantageously applied to diesel engines, and in particular to the diesel engines of vehicles.

The outer shape of the coupling according to the invention may be any shape and it is moreover generally a function of the respective location of the tank and the place where the line has to be connected. Preferably, the coupling according to the invention is an elbow coupling, i.e. formed from two substantially cylindrical sections that between them form an angle that is substantially a right angle. Its inner shape (i.e. the shape of the passage for the liquid) may be any shape, but it is generally substantially cylindrical.

The coupling according to the invention may be coupled in any known manner to the tank on the one hand, and to the line on the other hand. However, preferably it is a rapid connection of the quick connector type well known to a person skilled in the art. For this purpose, preferably, the coupling according to the invention is provided with a suitable relief (either internal or external) at its two ends. Preferably, said relief is inside of the side intended to be connected to the tank; it may be, for example, one or more grooves bearing protruding seals, for example of the O-ring type. Also preferably, this relief is outside of the side intended to be connected to the line, and is for example composed of several grooves in relief.

According to the invention, the coupling comprises a heating filament, at least one part of which extends freely inside this passage. The term "freely" is understood to mean that this filament (optionally provided with a protective coating) is directly in contact with the liquid (urea) present in this passage, and not embedded in an insulating structure such as a flexible tube for example. Generally, it is a resistive filament based on a conductive metal that is resistant to urea and/or that is provided with a coating that gives it such a resistance (PFA, FEP, PTFE).

Preferably, this "free" part has the shape of a loop or a spiral, the two ends of which may be connected to an electrical terminal (to effectively be able to heat the liquid). Preferably, this loop or spiral extends from the side of the coupling intended to be coupled to the tank and, particularly preferably, it also extends at least partly into the tank and/or into a tube attached thereto (see further on). Preferably, this loop/spiral penetrates up to the tank and in this way rapidly melts the plug of frozen liquid which could be found therein. In other words: within the scope of the invention, it is preferred that the loop/spiral "sticks out" from the coupling (and ipso facto, from the line) to be able to extend into the tank (or into a tube of this tank). A loop/spiral that penetrates into the tank by a few centimeters gives good results.

In order to facilitate the introduction of the loop into the coupling (and into the tank, if necessary), it is advantageous to support it with a guide which is of any shape, for example finger-shaped, and equipped with at least one fastening relief (clip, notch, etc.) that enables it to be attached to the loop—preferably only periodically so as not to lose too much of the surface area for heat exchange. This guide is preferably substantially rigid in order to keep the loop in position in the coupling/tank. Preferably, at least one fastening relief is intended for the top of the loop.

According to one particularly advantageous variant of the invention, an electrical terminal is attached to the coupling so as to enable the free ends of the heating filament to be connected to a power supply circuit. In a more particularly preferred manner, the heating filament of the coupling according to the invention comprises an additional length, not intended to extend freely into the coupling but rather to enable another part, for example of the line, to be heated.

Also in a more particularly preferred manner, the electrical terminal may enable a second heating filament, coiled round an outer surface of the line, to be connected to the power supply circuit independently of the filament of the loop/spiral.

Alternatively, the terminal may be used to connect another heating element in parallel or series. Preferably, this heating element comprises at least one flexible heating part (that is to say, equipped with a device enabling it to heat up, such as a resistive element for example). Preferably, this flexible part is a flexible heater, that is to say that it comprises at least one resistive track inserted between two flexible films or affixed to a flexible film. Alternatively, it may be a simple heating filament capable of being coiled around a part to be heated, or a PTC element.

Preferably, the electrical terminal is attached to the coupling, which is for this purpose provided with an opening that allows the passage of the filament and which is advantageously located in an excrescence provided for this purpose on the coupling. When the coupling is an elbow coupling, this excrescence is generally located on the angle (the vertex of the elbow). Preferably, the attachment of the terminal to the excrescence is carried out by a quick connection and the excrescence and/or the terminal are for this purpose provided with suitable reliefs.

In particular, in order to obtain an impermeable attachment, it is advantageous for the terminal to also comprise an excrescence intended to be inserted into the opening of the excrescence of the coupling and equipped with at least one seal, for example inserted in a groove provided for this purpose.

The present invention also relates to a line for a liquid tank equipped with a coupling as described previously, said line comprising, over substantially its entire length, a heating filament produced from one part with that of the coupling or a separate heating element connected in series or in parallel with that of the coupling. This filament (element) may be positioned inside the line or at its outer surface. For corrosion reasons, it is preferably positioned on its outer surface. In a more particularly preferred manner, this element is in the form of a filament coiled round the outer surface of the line.

One particularly advantageous variant of the invention is that according to which the heating filament is coiled round the outer surface of the line, one of its ends being directly connected to one post of an electrical terminal and the other describing a loop inside the coupling before being connected to the other post of the electrical terminal.

The present invention can be applied particularly well to a coupling made of plastic and preferably based on injection-moulded plastic. In particular, good results may be obtained with couplings made of polyamide (PA-11, PA-12 or PA-6,6), preferably reinforced, especially with glass fibres. This same material is also suitable for the electrical terminal, if necessary. In this case, it is advantageous to overmould the ends of the heating filament with the plastic forming the terminal.

The present invention also relates to a tank equipped with a coupling as described previously, and in particular to a tank for a urea solution intended for the exhaust gases of a motor vehicle. In particular, this tank is equipped with a tube moulded as one part with a submerged base plate as described later on, and onto which the coupling is attached.

This tank may be produced by any conversion processes known in the case of hollow bodies. One preferred processing method, in particular when the tank is made of plastic, and in particular HDPE, is the extrusion-blow moulding process. In this case a parison (in one or more parts) is obtained by extrusion, and is then shaped by blow moulding in a mould. One-part moulding of the tank from a single parison gives good results.

In order to enable the coupling to be connected to the tank, the latter is advantageously equipped with a type of flange or tube onto or in which the coupling is attached. This tube may be moulded as one part with the tank or with a part connected to this. According to one preferred variant, the tube is moulded as one part with a base plate or mounting plate which is a flat part intended to seal an opening in the wall of the tank. The base plate is, in particular, well suited to the support of accessories that pass through the wall of the hollow body. It has a perimeter, closed up on itself, of any shape. Usually, its perimeter has a circular shape.

In a particularly preferred manner, this base plate is a submerged mounting plate, i.e. sealing an opening in the lower wall of the tank. The expression "lower wall" is in fact understood to mean, within the scope of the invention, the lower half of the tank (whether or not it is moulded in one part or from two parison sheets or cut-outs). Preferably, the base plate is located in the lower third of the tank, and more particularly preferably, in the lower quarter, or even in the bottom of this tank. It may be partly in the lower side wall, in which case it is slightly inclined once mounted in the vehicle. The location and/or direction of the base plate namely depends on the location of the tank in the vehicle, and on the space occupied around it (considering the components to be integrated therein).

According to this variant of the invention, the base plate preferably also integrates at least one active storage and/or injection component. This is understood to mean that the component is attached to or produced as one part with the base plate. This component may be integrated into the inside of the tank, or onto the outside with, if necessary, a connection passing through this plate. This variant is the subject of Application FR 06/05082 in the name of the Applicant and the content of which is incorporated by reference in the present application.

Preferably, the base plate according to this variant of the invention integrates several active storage and/or metering components and, more particularly preferably, it integrates all the active components which are brought to be in contact with the liquid additive present in, leaving from or arriving into the additive tank.

Preferably, the component is chosen from the following elements: a pump; a level gauge; a heater; a temperature sensor; a quality sensor; a pressure sensor and a pressure regulator. These elements each have an active role in the additive storage and/or injection system, and the fact of integrating them into a mounting plate that is "submerged" (i.e. always in the presence of the additive, as long as the tank is not empty) has specific advantages:

for the level gauge: the low point is better defined and therefore the measurement is less affected by deformations of the tank;

for the heater: in the event of freezing, the development of a compartment through design of the mounting plate combined with the heating system make it possible to deliver the volume of additive solution required for the operation of the pollution control system within the time frame demanded by vehicle manufacturers (for example: 100 ml in thirty minutes);

for the temperature or quality sensors, or sensors of (an)other characteristic(s) of the additive: makes it possible to easily locate it in the critical zone for feeding to the injection system.

The level gauge may be of any type. Preferably, it is a gauge with no moving parts, for example of the capacitive type.

As for the heater, it may comprise a heat exchanger of given capacity, or a heating element preferably surrounded by a chamber (to create the aforementioned compartment). Preferably, this chamber is in one part (moulded from one part, where appropriate) with the base plate.

The base plate submerged in this tank (when it comprises one therein) may also be obtained by any known means, but it is preferably obtained by injection moulding, this method making it possible to obtain high dimensional accuracy.

Preferably, the base plate is based on a fuel-resistant material such as polyacetal, and in particular POM (polyoxymethylene), or polyamides, and in particular grades of polyamides that are reinforced (for example, with glass fibres). Preferably, the base plate is made of polyamide and it comprises a tube moulded as one part with it and intended to be connected to the coupling as described previously.

The present invention is illustrated, in a non-limiting manner, by the appended FIG. 1.

A coupling (1) according to one particularly preferred variant of the invention can be seen therein, coupled to a line (2) for feeding urea to an injector or to a urea pump (not shown). It is an elbow coupling of which one end (3) is intended to be snap-fastened to a tube of a urea tank (not shown) and of which the other end (4) is fixed into the urea line (2). For this purpose, these ends are respectively provided with protruding seals (5) inserted into internal grooves (6), and external protruding grooves (7). The coupling (1) and line (2) are made of plastic.

An electrical terminal (8), also made of plastic, is snap-fastened to the coupling (1). This coupling overmoulds the two ends (9', 9") of a heating filament (9) that describes a loop inside the coupling (1), and that furthermore is subjected to a spiral spinally coiled (10) around the line (2).

The filament loop (9) was inserted into the coupling (1) using a support (11) that is finger-shaped which is fastened to an excrescence (12) of the terminal inserted into an orifice provided for this purpose in the angle/elbow of the coupling, which for this purpose also comprises an excrescence (13). This finger (11) is provided at its tip with a fastening relief (not shown) that enables it to be fastened to the top of the loop.

The leaktightness between the excrescence (12) of the electrical terminal (8) and the opening in the excrescence (13) of the coupling (1) is achieved using a seal (14).

Generally, the line (2) and the coupling (1) are pre-assembled and the assembly is mounted on a urea tank (or a tube of this tank as explained above).

The invention claimed is:

1. A urea feed or return line that comprises:
a coupling connected to a urea tank that includes a passage for urea and a first heating filament, at least one part of which extends freely inside the passage for the urea, the at least one part having the shape of a loop or a spiral capable of also extending at least partly into the urea tank and/or into a tube attached to the urea tank; and
a second heating filament inside the line that is connected in series or in parallel with the first heating filament,
wherein the coupling is connected to a tube molded as one part with a base that seals an opening in a wall of the urea tank and that integrates at least one active storage and/or injection component.

2. The line according to claim 1, wherein the coupling is based on injection-moulded plastic.

3. The line according claim 1, wherein the coupling is formed from two substantially cylindrical sections that form an angle that is substantially a right angle.

4. The line according to claim 1, wherein the coupling is provided with reliefs enabling a quick connection to the urea tank on one end of the coupling, and to the line on an other end of the coupling.

5. The line according to claim 1, wherein the loop part or the spiral part is a guide that facilitates insertion into the coupling.

6. The line according to claim 1, wherein an electrical terminal is connected to the loop part or the spiral part and is attached to an excrescence of the coupling provided with an opening that allows the passage of the first heating filament, the excrescence and/or the electrical terminal being provided with reliefs to rapidly couple the excrescence to the electrical terminal.

7. The line according to claim 1, wherein one end of the second heating filament is connected to one post of an electrical terminal and an other end of the heating filament is in series with the first heating element which is connected to an other post of the electrical terminal.

8. The line according to claim 1, wherein the second heating filament is produced from one part with the first heating filament.

9. The line according to claim 1, wherein the second heating filament is separate from the first heating element.

* * * * *